US006596126B1

(12) United States Patent
Shannon et al.

(10) Patent No.: US 6,596,126 B1
(45) Date of Patent: Jul. 22, 2003

(54) MODIFIED POLYSACCHARIDES CONTAINING ALIPHATIC HYDROCARBON MOIETIES

(75) Inventors: Thomas Gerard Shannon, Neenah, WI (US); Daniel Arthur Clarahan, Greenleaf, WI (US); Mike Thomas Goulet, Neenah, WI (US); Wen Zyo Schroeder, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/488,430

(22) Filed: Jan. 20, 2000

Related U.S. Application Data
(60) Provisional application No. 60/117,087, filed on Jan. 25, 1999.

(51) Int. Cl.$^7$ .......................... D21H 13/30; D21H 17/24
(52) U.S. Cl. .................... 162/177; 162/175; 162/157.1; 162/183; 162/184; 162/185; 162/186; 162/157.6
(58) Field of Search ................................. 162/175, 176, 162/177, 178, 179, 135, 157.1, 183, 184, 185, 186, 157.6

(56) References Cited

U.S. PATENT DOCUMENTS

| | | |
|---|---|---|
| 2,661,349 A | 12/1953 | Caldwell et al. |
| 2,876,217 A | 3/1959 | Pachall |
| 2,926,116 A | 2/1960 | Keim |
| 2,926,154 A | 2/1960 | Keim |
| 2,995,513 A | 8/1961 | Paschall et al. |
| 3,128,311 A | 4/1964 | Shirley et al. |
| 3,152,998 A | 10/1964 | Moss |

(List continued on next page.)

FOREIGN PATENT DOCUMENTS

| | | |
|---|---|---|
| CA | 2296826 | 7/2000 |
| CA | 2296891 | 7/2000 |
| CA | 2296894 | 7/2000 |
| DE | 2 247 943 | 4/1973 |
| EP | 0 469 891 A1 | 2/1992 |
| EP | 0 620 315 A1 | 10/1994 |
| EP | 0 761 691 A2 | 3/1997 |
| WO | WO 99/12977 A1 | 3/1999 |

OTHER PUBLICATIONS

Derwent World Patent Database abstract of SU 451,731: Description of Vladimir Synth Resi, "Cyanoethylated Starch Adhesive for Electroluminescent Lamps."

(List continued on next page.)

Primary Examiner—Steven P. Griffin
Assistant Examiner—Carlos Lopez
(74) Attorney, Agent, or Firm—Gregory E. Croft

(57) ABSTRACT

Modified polysaccharides (such as starches, gums, chitosans, celluloses, alginates, sugars, etc.), which are commonly used in the paper industry as strengthening agents, surface sizes, coating binders, emulsifiers and adhesives, can be combined into a single molecule with modified aliphatic hydrocarbons, which are commonly utilized, in conjunction with cationic moieties, as softeners, debonders, lubricants and sizing agents. The resulting molecule is a modified polysaccharide having an aliphatic moiety which can provide several potential benefits, depending on the specific combination employed, including: (a) strength aids that do not impart stiffness; (b) softeners that do not reduce strength; (c) wet strength with improved wet/dry strength ratio; (d) debonders with reduced linting and sloughing; (e) strength aids with controlled absorbency; and (f) surface sizing agents with improved tactile properties.

5 Claims, 1 Drawing Sheet

U.S. PATENT DOCUMENTS

| | | | | |
|---|---|---|---|---|
| 3,155,728 A | | 11/1964 | Lesesne | |
| 3,236,792 A | * | 2/1966 | Curtis | 260/17.3 |
| 3,236,895 A | | 2/1966 | Lee et al. | |
| 3,240,721 A | | 3/1966 | Fordyce | |
| 3,250,664 A | | 5/1966 | Conte et al. | |
| 3,347,926 A | | 10/1967 | Zech | |
| 3,434,984 A | | 3/1969 | Hyland, Jr. | |
| 3,436,359 A | | 4/1969 | Hubin et al. | |
| 3,438,970 A | | 4/1969 | Chamberlain et al. | |
| 3,449,886 A | | 6/1969 | Connelly et al. | |
| 3,511,830 A | | 5/1970 | Speakman | |
| 3,513,156 A | | 5/1970 | Speakman | |
| 3,609,126 A | | 9/1971 | Asao et al. | |
| 3,620,913 A | | 11/1971 | Parmerter | |
| 3,649,624 A | | 3/1972 | Powers et al. | |
| 3,654,370 A | | 4/1972 | Yeakey | |
| 3,770,472 A | * | 11/1973 | Jarowenko | 106/213 |
| 3,793,279 A | | 2/1974 | Lipowski | |
| 3,893,885 A | | 7/1975 | Ziemann et al. | |
| 3,940,519 A | | 2/1976 | Helmer et al. | |
| 4,014,933 A | | 3/1977 | Boettger et al. | |
| 4,066,495 A | | 1/1978 | Voigt et al. | |
| 4,153,581 A | | 5/1979 | Habermann | |
| RE30,193 E | * | 1/1980 | O'Shaughnessy | 260/45.7 |
| 4,267,059 A | | 5/1981 | Behn et al. | |
| 4,278,573 A | * | 7/1981 | Tessler | 260/17.4 |
| 4,447,498 A | | 5/1984 | Fink et al. | |
| 4,450,045 A | | 5/1984 | Hertel et al. | |
| 4,501,640 A | | 2/1985 | Soerens | |
| 4,521,490 A | | 6/1985 | Pocius et al. | |
| 4,741,804 A | * | 5/1988 | Solarek et al. | 162/175 |
| 4,764,418 A | | 8/1988 | Kuenn et al. | |
| 4,766,245 A | | 8/1988 | Larkin et al. | |
| 4,788,243 A | | 11/1988 | Soerens | |
| 4,801,699 A | * | 1/1989 | Jobe et al. | 536/59 |
| 4,824,689 A | | 4/1989 | Kuenn et al. | |
| 4,866,151 A | * | 9/1989 | Tsai et al. | 527/300 |
| 4,959,125 A | | 9/1990 | Spendel | |
| 4,973,680 A | | 11/1990 | Billmers | |
| 4,983,748 A | * | 1/1991 | Tsai et al. | 549/551 |
| 5,174,927 A | | 12/1992 | Honsa | |
| 5,354,425 A | * | 10/1994 | Mackey et al. | |
| 5,518,585 A | | 5/1996 | Huth et al. | |
| 5,525,345 A | * | 6/1996 | Warner et al. | 162/158 |
| 5,552,020 A | | 9/1996 | Smith et al. | |
| 5,575,891 A | | 11/1996 | Trokhan et al. | |
| 5,578,678 A | | 11/1996 | Hartmann et al. | |
| 5,591,306 A | | 1/1997 | Kaun | |
| 5,612,443 A | * | 3/1997 | Martino et al. | 528/229 |
| 5,624,532 A | | 4/1997 | Trokhan et al. | |
| 5,626,719 A | * | 5/1997 | Tansley et al. | 162/158 |
| 5,656,746 A | * | 8/1997 | Smith et al. | 536/63 |
| 5,716,692 A | | 2/1998 | Warner et al. | |
| 5,717,087 A | * | 2/1998 | Kalbe et al. | 424/488 |
| 5,746,887 A | | 5/1998 | Wendt et al. | |
| 5,770,711 A | * | 6/1998 | Greene et al. | 536/18.6 |
| 5,772,845 A | | 6/1998 | Farrington, Jr. et al. | |
| 5,785,813 A | | 7/1998 | Smith et al. | |
| 5,856,299 A | * | 1/1999 | Righetto et al. | 514/8 |
| 5,958,187 A | * | 9/1999 | Bhat et al. | 162/125 |
| 6,059,928 A | * | 5/2000 | Van Luu et al. | 162/111 |
| 6,090,242 A | | 7/2000 | Drummond et al. | |
| 6,126,784 A | * | 10/2000 | Ficke et al. | 162/184 |
| 6,153,053 A | | 11/2000 | Harper et al. | |
| 6,190,678 B1 | * | 2/2001 | Hasenoehrl et al. | 424/401 |
| 6,193,843 B1 | | 2/2001 | Tsai et al. | |
| 6,204,254 B1 | | 3/2001 | Nelson et al. | |
| 6,207,012 B1 | | 3/2001 | Oriaran et al. | |
| 6,207,013 B1 | | 3/2001 | Oriaran et al. | |
| 6,235,155 B1 | | 5/2001 | Schroeder et al. | |
| 6,398,911 B1 | | 6/2002 | Schroeder et al. | |
| 2002/0074098 A1 | | 6/2002 | Shannon et al. | |

OTHER PUBLICATIONS

Burr, R.C., et al., "Starch Graft Copolymers for Water Treatment," *Die Starke*, 27, Nr. 5, 1975, pp. 155–159.

Cheng, W.C., et al., "O–Carboxymethylstarch Amine Polyampholytes as Papermaking Additives," *Starch/Stärke*, vol. 30, No. 8, Aug. 1978, pp. 280–282.

Farewell, John, Editor, *Commercially Available Chemical Agents for Paper and Paperboard Manufacture*, Fourth Edition, Tappi Press, 1990, pp. 5–6.

Hamerstrand, G.E., et al., "An Evaluation of Cationic Aminoethyl Cereal Flours as Wet–End Paper Additives," *Tappi*, vol. 58, No. 1, Jan. 1975, pp. 112–115.

Heath, H.D., et al., "Flocculating Agent–Starch Blends for Interfiber Bonding and Filler Retention: Comparative Performance With Cationic Starches," *Tappi*, vol. 57, No. 11, Nov. 1974, pp. 109–111.

Lindsay, William F., "Absorbent Starch Based Co–polymers—Their Characteristics and Applications," *Formed Fabrics Industry*, 8(5), 1977, pp. 20, 24, 26.

Van Beynum, G.M.A., editor, *Starch Conversion Technology*, Marcel Dekker, Inc., New York, 1985, pp. 92–93.

* cited by examiner

MODIFIED POLYSACCHARIDES CONTAINING ALIPHATIC HYDROCARBON MOIETIES

This application claims priority from U.S. Provisional Application No. 60/117,087 filed on Jan. 25, 1999.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality compete for the limited available bonding sites, oftentimes resulting in the insufficient retention of one or both chemicals on the fibers.

Therefore, there is a need for a means of applying more than one chemical functionality to a paper web which mitigates the limitations created by limited number of bonding sites.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, modified polysaccharides (such as starches, gums, chitosans, celluloses, alginates, sugars, etc.), which are commonly used in the paper industry as strengthening agents, surface sizes, coating binders, emulsifiers and adhesives, can be combined into a single molecule with modified aliphatic hydrocarbons, which are commonly utilized, in conjunction with cationic moieties, as softeners, debonders, lubricants and sizing agents. The resulting molecule is a modified polysaccharide having an aliphatic moiety which can provide several potential benefits, depending on the specific combination employed, including: (a) strength aids that do not impart stiffness; (b) softeners that do not reduce strength; (c) wet strength with improved wet/dry strength ratio; (d) debonders with reduced linting and sloughing; (e) strength aids with controlled absorbency; and (f) surface sizing agents with improved tactile properties.

Hence in one aspect, the invention resides in a modified polysaccharide containing one or more aliphatic hydrocarbon moieties, said modified polysaccharide having the following structure:

$$\text{Polysac}-Z_3R_1$$

or $$-\text{Polysac}-Z_3R_1-\text{Polysac}-$$

where

Polysac=any polysaccharide, monosaccharide, or sugar residue, modified or unmodified.

$R_1$=any organofunctional group with the only limitation being that $R_1$ must contain a moiety consisting of a saturated or unsaturated, substituted or unsubstituted, linear or branched $C_8$ or higher aliphatic hydrocarbon.

$Z_3$=a bridging radical whose purpose is to attach the R1 functional moiety to the Polysac residue. Suitable bridging radicals would include but are not limited to —OOC—, —COO—, —NHCO—, —OCNH—, —O—, —S—, CONHCO, —NCOO, —OSO$_2$O—, —OCOO—, —OOC—Ar—O—.

In another aspect, the invention resides in a paper sheet, such as a tissue sheet, comprising a modified polysaccharide containing one or more aliphatic hydrocarbon moieties, said modified polysaccharide having the following structure:

$$\text{Polysac}-Z_3R_1$$

or $$-\text{Polysac}-Z_3R_1-\text{Polysac}-$$

where

Polysac=any polysaccharide, monosaccharide, or sugar residue, modified or unmodified.

$R_1$=any organofunctional group with the only limitation being that $R_1$ must contain a moiety consisting of a saturated or unsaturated, substituted or unsubstituted, linear or branched $C_8$ or higher aliphatic hydrocarbon.

$Z_3$=a bridging radical whose purpose is to attach the R1 functional moiety to the Polysac residue. Suitable bridging radicals would include but are not limited to —OOC—, —COO—, —NHCO—, —OCNH—, —O—, —S—, CONHCO, —NCOO—, —OSO$_2$O—, —OCOO—, —OOC—Ar—O—.

In another aspect, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a modified polysaccharide is added to the aqueous suspension or to the web during or after drying, said modified polysaccharide having the following structure:

$$\text{Polysac}-Z_3R_1$$

or $$-\text{Polysac}-Z_3R_1-\text{Polysac}-$$

where

Polysac=any polysaccharide, monosaccharide, or sugar residue, modified or unmodified.

$R_1$=any organofunctional group with the only limitation being that $R_1$ must contain a moiety consisting of a saturated or unsaturated, substituted or unsubstituted, linear or branched $C_8$ or higher aliphatic hydrocarbon.

$Z_3$=a bridging radical whose purpose is to attach the R1 functional moiety to the Polysac residue. Suitable bridging radicals would include but are not limited to —OOC—, —COO—, —NHCO—, —OCNH—, —O—, —S—, CONHCO, —NCOO, —OSO$_2$O—, —OCOO—, —OOC—Ar—O—.

The amount of the modified polysaccharide added to the fibers can be from about 0.02 to about 2 weight percent, on a dry fiber basis, more specifically from about 0.05 to about 1 weight percent and still more specifically from about 0.1 to about 0.75 weight percent. The modified polysaccharide can be added to the fibers at any point in the process where the fibers are suspended in water.

As used herein, "polysaccharides" are carbohydrates that can be hydrolyzed to many monosaccharides and include, but are not limited to, starches (primarily starches from potato, corn, waxy maize, tapioca and wheat) which can be unmodified, acid modified, enzyme modified, cationic, anionic or amphoteric; carboxymethylcellulose, modified or unmodified; natural gums, modified or unmodified (such as from locust bean and guar); sugars, modified or unmodified; chitosan, modified or unmodified; and dextrins, modified and unmodified.

A "monosaccharide" is a carbohydrate that cannot be hydrolyzed into simpler compounds.

"Carbohydrates" are polyhydroxy aldehydes, polyhydroxy ketones or compounds that can be hydrolyzed to them.

As used herein, "aliphatic hydrocarbons" encompasses a broad group of organic compounds, including in general alkanes, alkenes, alkynes and cyclic aliphatic classifications. The aliphatic hydrocarbons can be linear or branched, saturated or unsaturated, substituted or non-substituted.

Methods of making paper products which can benefit from the various aspects of this invention are well known to those skilled in the papermaking art. Exemplary patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

Figure 1:
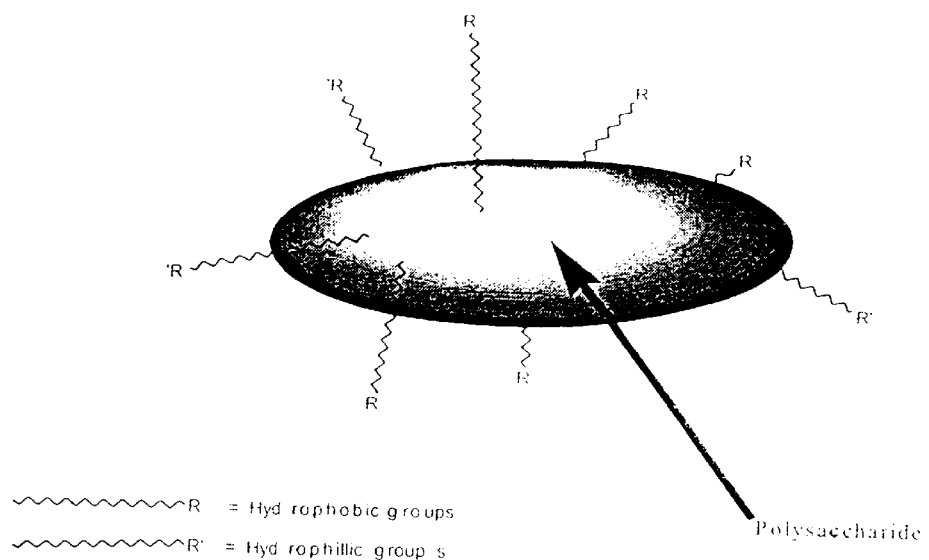
FIG. 1 shows a macroscopic structure of amphiphilic moieties attached in pendant fashion to a polysaccharide.

To further describe the invention, examples of the synthesis of some of the various chemical species are given below.

Polysaccharides

Starches

Unmodified starch has the structure as shown below. Unmodified starches can differ in properties such as amylopectin : amylose ratio, granule dimension, gelatinization temperature, and molecular weight. Unmodified starches have very little affinity for fibers, and modifications are widely done to extend the number of wet end starch additives available for use. Modifications to starches generally fall under one of the following categories: 1) Physical modifications, 2) Fractionation into amylose and amylopectin components, 3) Thermomechanical conversion, 4) Acid hydrolysis, 5) Chemical modifications, 6) Oxidation, 7) Derivatization and 8) Enzyme conversion.

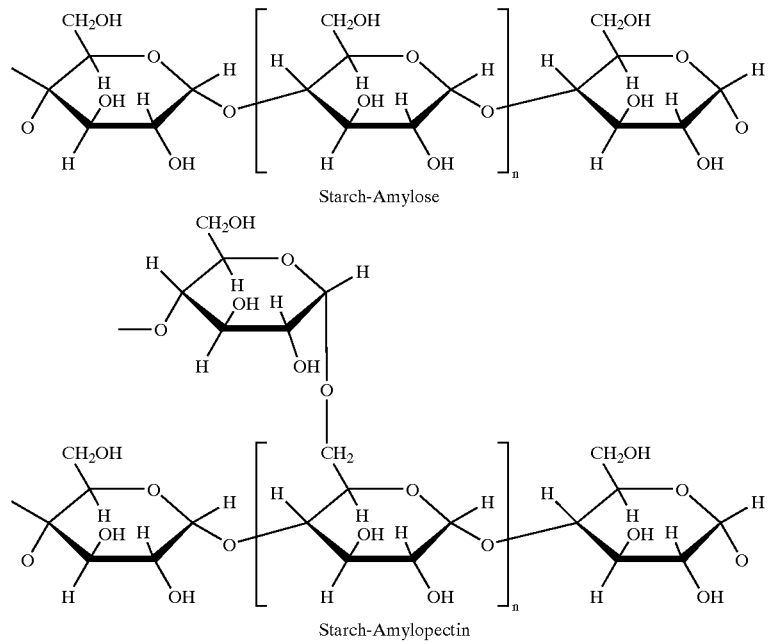

Starch-Amylose

Starch-Amylopectin

Starch derivatives are the most common type of dry strength additive used in the paper industry. The 1990 edition of the TAPPI publication "Commercially Available Chemical Agents for Paper and Paperboard Manufacture" lists 27 different starch dry strength products. Starch chemistry primarily centers on reactions with the hydroxyl groups and the glucosidic (C—O—C) linkages. Hydroxyl groups being subject to standard substitution reactions and the glucosidic linkages being subject to cleavage. In theory the primary alcohol at the C-6 position should be more reactive than the secondary alcohols at the C-2 and C-3 positions. Also, it has been found that the tuber starches are more reactive than the cereal starches.

A large variety of starch esters and ethers have been described. Few have been actively marketed due to non-specific properties resulting from the substitution groups. Esters will generally be prepared via reaction of the acid chloride or anhydride with the starch. Hydrophobic type structures can be introduced with this functionalization and such structures have found applications in the paper industry as adhesives, and grease resistant paper size coatings. (Starch Conversion Technology, 1985) Cationic starches are recognized as the choice for wet end additives due to their substantivity with cellulose fibers. The cationization of starches is accomplished by reaction with various tertiary and quaternary amine reagents. In general, a reactive chloride or epoxy group on one end of the reagent reacts with a starch hydroxyl group. The cationic portion of the amine then ionizes in the presence of water to form the positively charged derivative which is substantive to fiber.

Other ionic charged starches are produced by reaction of starch with amino, imino, ammonium, sulfonium, or phosphonium groups, all of which carry an ionic charge. The key factor in their usefulness is their affinity for negatively charged substrates such as cellulose. These cationic starches have found widespread use in the paper industry as wet end additives, surface sizing agents and coating binders. Cationic starches improve sheet strength by promoting ionic bonding and additional hydrogen bonding within the cellulose fibers. Some common reagents used to prepare cationic starches include: 2-diethylaminoethyl chloride (DEC); 2-dimethylaminoethyl chloride; 2-diisopropylaminoethyl chloride; 2-diethylaminoethyl bromide; 2-dimethylamino-isopropyl chloride; N-alkyl-N-(2-haloethyl)-aminomethyl-phosphonic acids; and 2,3-epoxypropyltrimethylammonium chloride.

Epichlorohydrin reacts with tertiary amines or their salts in water or nonaqueous solvents to form the quaternary ammonium reagents. Trimethylamine, dimethylbenzyl amine, triethylamine, N-ethyl and N-methyl morpholine, dimethylcyclohexylamine, and dimethyldodecylamine (Paschall, E. F., U.S. Pat. No. 2,876,217, 1959 and U.S. Pat. No. 995,513, 1961) have been used.

Cyanamide and dialkyl cyanamides can be used to attach imino carbamate groups on starches. These groups show cationic activity upon treatment with acids. The acidified products are stable to hydrolysis. Cationic cyanamide starches show useful properties as textile sizes and dry strength additives in paper. (Chamberlain, R. J., U.S. Pat. No. 3,438,970, 1969)

Aminoethylated starches are produced by treatment of ethyleneimine with starch in organic solvents or dry. Acidified products are useful as wet end paper additives (Hamerstrand, et al, "An evaluation of cationic aminoethyl cereal flours as wet end paper additives" Tappi, 58, 112, 1975). Starches react with isatoic anhydride and its derivatives to form anthranilate esters with primary or secondary amino groups (U.S. Pat. Nos., 3,449,886; 3,511,830; 3,513,156; 3,620,913). Products with primary amino anthranilate groups can be derivatized and used to improve wet rub resistance in paper coatings.

Cationic starches containing anionic xanthate groups provided both wet strength and dry strength to paper when used as wet end additives in unbleached kraft pulp systems. (Powers, et al, U.S. Pat. No. 3,649,624, 1972). In this system it is believed that the permanent wet strength results from covalent bonding from the xanthate side chain reactions. (Cheng, W. C., et al, Die Starke, 30, 280, 1978) Cationic dialdehyde starches are useful wet end additives for providing temporary wet strength to paper. They are produced by periodic acid oxidation of tertiary amino or quaternary ammonium starches, by treating dialdehyde starch with hydrazine or hydrazide compounds containing tertiary amino or quaternary ammonium groups, and several other reactions.

Graft copolymers of starch are widely known. Some graft copolymers made with starches include: vinyl alcohol; vinyl acetate; methyl methacrylate; acrylonitrile; styrene; acrylamide; acrylic acid; methacrylic acid; and cationic monomers with amino substituents including:2-hydroxy-3-methacrylopropyltrimethylammonium chloride (HMAC);N,N-dimethylaminoethyl methacrylate, nitric acid salt (DMAEMA*$HNO_3$); N-t-butylaminoethyl methacrylate, nitric acid salt (TBAEMA*$HNO_3$); and N,N,N-trimethyl-aminoethyl methacrylate methyl sulfate (TMAEMA*MS).

Polyacrylonitrile (PAN)/starch graft copolymers are well known in the art. Treatment of the PAN/starch graft copolymers with NaOH or KOH converts the nitrile substituents to a mixture of carboxamide and alkali metal carboxylate. Such hydrolyzed starch-g-PAN polymers (HSPAN) are used as thickening agents and as water absorbents. Important applications for HSPAN include use in disposable soft goods designed to absorb bodily fluids. (Lindsay, W. F., Absorbent Starch Based Copolymers—Their Characteristics and Applications, Formed Fabrics Industry, 8(5), 20, 1977).

Copolymers with water soluble grafts are also well known. Many of the water soluble graft copolymers are used for flocculation and flotation of suspended solids in the paper, mining, oil drilling and other industries. (Burr, R. C., et al, "Starch Graft Copolymers for Water Treatment", *Die Starke*, 27, 155, 1975. Graft copolymers from the cationic amine containing monomers are effective retention aids in the manufacture of filled papers. Starch-g-poly(acrylamide-co-TMAEMA*MS) was found to improve drainage rates while increasing dry tensile strength of unfilled paper handsheets. (Heath, H. D., et al, "Flocculating agent-starch blends for interfiber bonding and filler retention, comparative performance with cationic starches", TAPPI, 57(11), 109, 1974.) Thermoplastic-g-starch materials are also known, primarily with acrylate esters, methacrylate esters and styrene. Primary interest for these materials is in preparation of biodegradable plastics. No use of these materials as a paper additive has been found.

Other miscellaneous graft copolymers are known. Saponified starch-g-poly(vinyl acetate) has been patented as a sizing agent for cotton, rayon and polyester yarns. (Prokofeva, et al, Russian patent 451731, 1975). Graft copolymers have been saponified to convert starch-g-poly (vinyl acetate) copolymers into starch-g-poly(vinyl acetate) copolymers. As with the thermoplastic-g-starch copolymers most of these materials have been evaluated as polymeric materials in their own right and not as additives for paper.

Carboxymethyl cellulose, methyl cellulose, alginate, and animal glues are superior film formers. These materials are typically applied via surface application and not added in the wet end of the process to improve dry strength. The products are relatively expensive and although they can be used alone they are typically employed in conjunction with starches or other materials.

Gums

Gums and mucilages have been use in papermaking dates back to ancient China. These mucilages were obtained from various plant roots and stems and were used primarily as deflocculating and suspending agents for the long fibered pulps. As papermaking evolved other advantages of using these materials became obvious including the ability of these materials to hold the wet fiber mat together during the drying process. As papermaking evolved to using shorter and shorter fibers these gums found increased use as a means of obtaining paper strength. Since World War II the use of gums in papermaking has increased substantially.

Water soluble, polysaccharide gums are highly hydrophilic polymers having chemical structures similar to cellulose. The main chain consists of B-1,4 linked mannose sugar units with occurrence of a-1,6 linked galactose side chains. Their similarity to cellulose means they are capable of extensive hydrogen bonding with fiber surfaces. Further enhancement of dry strength occurs due to the linear nature of the molecules. They are vegetable gums and include as examples 1) locust bean gum, 2) guar gum, 3) tamarind gum, and 4) karaya, okra and others. Locust bean gum and guar gum are the most commonly used. They have been used in the paper industry since just prior to WWII. Since the natural materials are non-ionic they are not retained on fibers to any great extent. All successful commercial products have cationic groups attached to the main chain which increases the retention of the gums on the fiber surfaces. Typical addition rates for these materials are on the order of 0.1–0.35%.

The dry strength improvement of paper furnishes through use of polysaccharide gums is derived from the linear nature of the polymer and through hydrogen bonding of the hydroxyl hydrogen of the polymer with similar functional groups on the surface of the cellulosic fibers.

The most effective gums are quaternary ammonium chloride derivatives containing a cationic charge. The cationic functionality will help the gum retain better to the fibers as well as reducing the usually higher negative zeta potential of the paper furnish, especially when fillers and fines are present in the white water. This change in zeta potential leads to a more thorough agglomeration of the fines in the system by forming more cohesive flocs. These in turn are trapped by longer fibers filling the voids among the larger fibers with additional material that helps in the inter fiber bonding of the wet web, which in turn leads to dry strength improvement.

Although a variety of guar gum derivatives have been prepared, there are only three derivatizations which have achieved commercial significance. These are 1) Quaternization, 2) Carboxymethylation and 3) Hydroxypropylation. As shown below the structure of guar gum and derivatives.

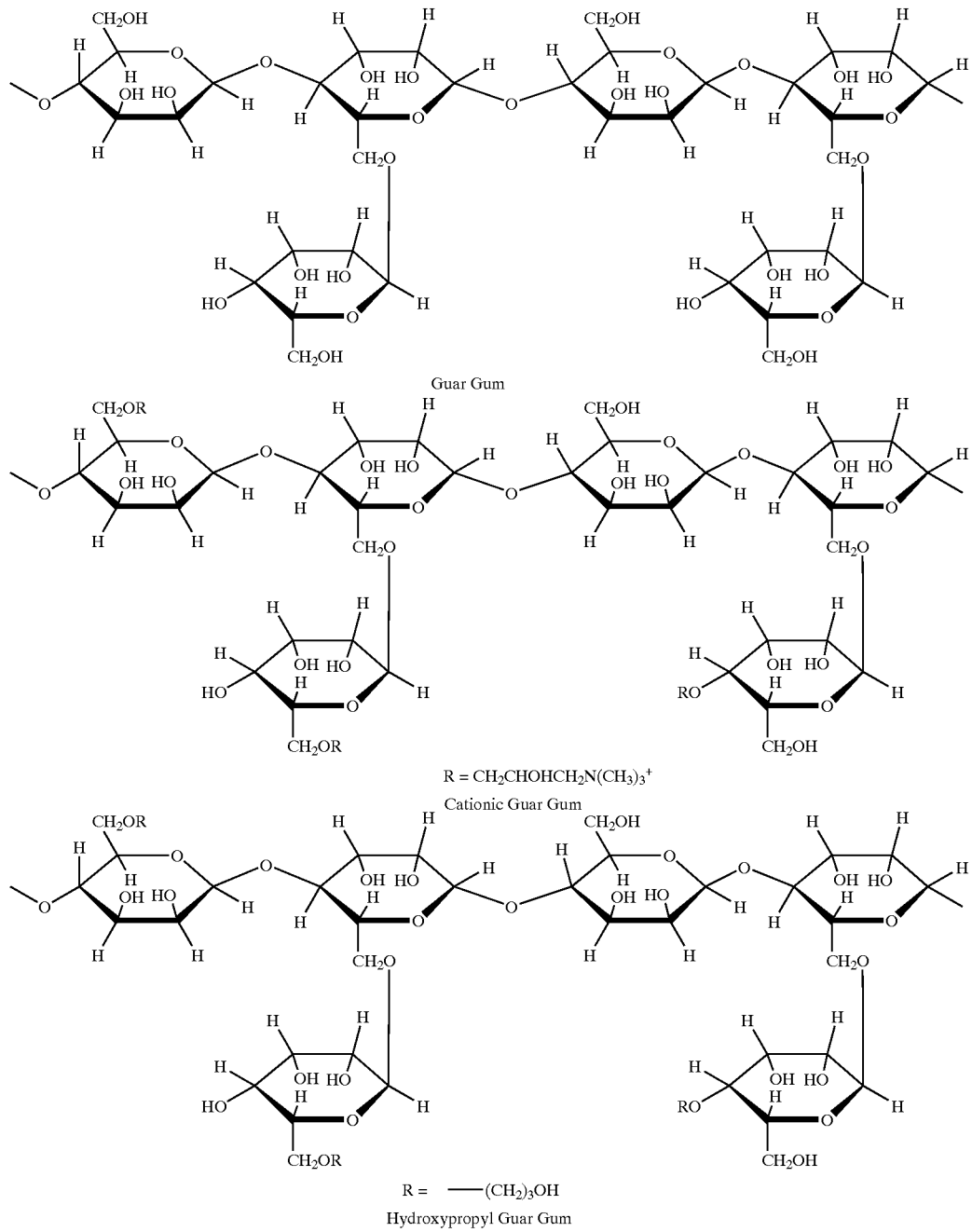

Guar Gum $R = CH_2CHOHCH_2N(CH_3)_3^+$
Cationic Guar Gum $R = \text{—}(CH_2)_3OH$
Hydroxypropyl Guar Gum

Chitosan

Chitosan is a high molecular weight linear carbohydrate composed of β-1,4-linked 2-amino-2-deoxy-D-glucose units. It is prepared from the hydrolysis of the N-acetyl derivative called chitin. Chitin is isolated in commercial quantities from the shells of crustaceans. Chitin is insoluble in most common solvents, however, chitosan is soluble in acidified water due to the presence of basic amino groups. Depending on the source and degree of deacetylation chitosans can vary in molecular weight and in free amine content. In sufficiently acidic environments the amino groups become protonated and chitosan behaves as a cationic polyelectrolyte. Chitosan has been used as an effective dry strength additive for paper.

The structure of chitosan is shown below.

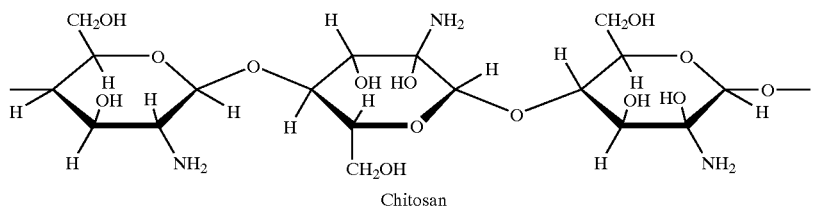
Chitosan

Sugars

Also included in the saccharides are the simple sugars. These include the hexoses shown below. These compounds actually exist in the cyclic acetal form as shown below for glucose. Derivatives of these sugars are included within this definition. Such derivatives include but are not limited to things such as gluconic acid, mucic acid, mannitol, sorbitol, etc. The derivatives generally do not exist in cyclic form.

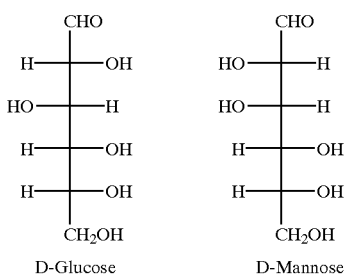
D-Glucose     D-Mannose

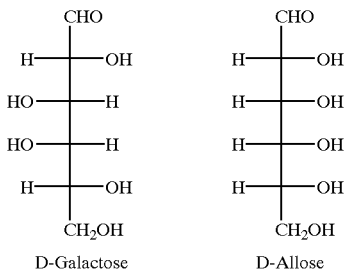
D-Galactose     D-Allose

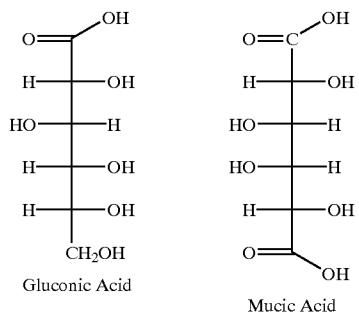
Gluconic Acid     Mucic Acid

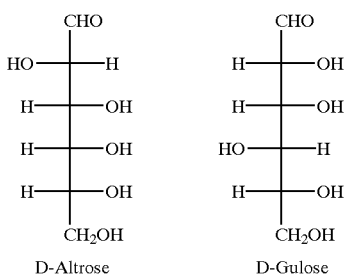
D-Altrose     D-Gulose

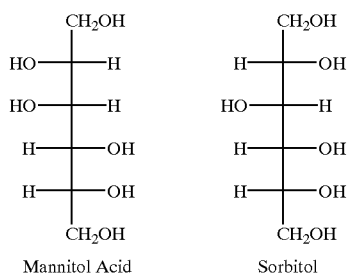
Mannitol Acid     Sorbitol

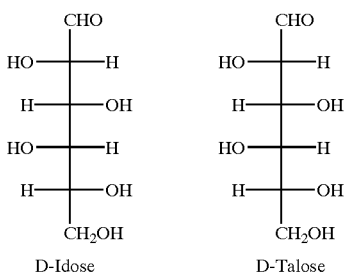
D-Idose     D-Talose

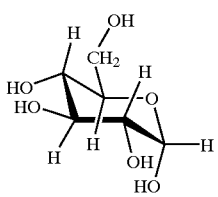

Aliphatic Hydrocarbon Moieties

Aliphatic hydrocarbons encompasses a broad group of organic compounds, including in general alkanes, alkenes, alkynes and cyclic aliphatic classifications. For purposes of this patent application, the aliphatic hydrocarbons can be linear or branched, saturated or unsaturated, substituted or non-substituted chain with a length of 8 or more carbon atoms.

Modified Polysaccharides Containing Aliphatic Hydrocarbons

Two primary methods are envisioned for incorporating aliphatic hydrocarbon moieties into the polysaccharide based materials. In the first scheme the hydrocarbon moieties are added via reaction between a functional group on the starch and a second functional group attached to the reagent containing the aliphatic hydrocarbon moiety. The polysaccharides may be derivatized or non-derivatized, cationic or non-cationic. The general reaction scheme is defined as follows:

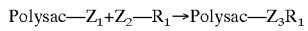

where:
$Z_1$=functional group attached to the polysaccharide molecule and may be present either from the natural state or from a derivatization process. Examples of $Z_1$ functional groups include but is not limited to —OH, —NH$_2$, —COOH, —CH$_2$X (X=halogen), —CN, —CHO, —CS$_2$.
$Z_2$=Functional group attached to the $R_1$ moiety whose purpose is to react with a $Z_1$ functional group thereby attaching the $R_1$ moiety covalently to the polysaccharide.
$R_1$=any organofunctional group with the only limitation being that $R_1$ must contain a moiety consisting of a saturated or unsaturated, substituted or unsubstituted, linear or branched $C_8$ or higher aliphatic hydrocarbon.
$Z_3$=Bridging ligand formed as the result of reaction of $Z_1$ with $Z_2$.

Such materials in general will have a macroscopic structure as shown in FIG. 1 where the aliphatic moieties are attached in a pendant fashion to the polysaccharide. Where decreased water solubility becomes an issue a second moiety, containing a hydrophilic portion may be attached to the polysaccharide. Examples of such materials would include ethylene glycol and its oligomers and polymers.

In theory the $Z_2$—$R_1$ reactant could be difunctional of the form $Z_2$—$R_2$—$Z_2$, however, in the case of most high molecular weight polysaccharides this crosslinking would be expected to lead to water insoluble products, suitable perhaps for coatings but not useful for wet end applications.

Synthesis of modified polysaccharides similar to those in FIG. 1 could be prepared via a number of methods. Attachment of the aliphatic hydrocarbon moiety could be achieved via the following paths:

1) Modified cationic polysaccharides prepared via reaction with one of the following or similar reagents:

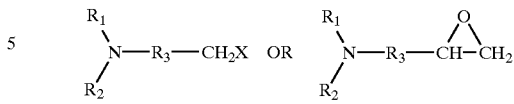

where $R_1$, $R_2$, $R_3$ are any alkyl groups, chosen such that at least one of $R_1$, $R_2$, or $R_3$ is linear or branched, saturated or unsaturated, substituted or unsubstituted $C_8$ or higher aliphatic hydrocarbon.

More specifically defined examples of this approach are as follows:
i.) Were $R_3$ is an alkyl group of the form —(CH$_2$)$_n$— where n=1 to 4, and $R_1$ and/or $R_2$ is a long chain alkyl group, linear or branched of 8 or more carbons
ii.) Where $R_3$ a polyethylene glycol residue {—(CH$_2$CH$_2$O)$_n$—} and $R_1$ and $R_2$ are alkyl groups.
iii.) Where $R_3$ is a polytetraflouroethylene residue {—(CF$_2$CF$_2$)$_n$—} and $R_1$ and $R_2$ are alkyl groups.

Note that in case (ii.) a hydrophilic entity in the form of the polyethylene glycol radical has been introduced into the polysaccharide product as well.

2) Dialdehyde polysaccharides, particularly dialdehyde starches, cationic or non-cationic, modified with fatty acid groups via reaction of the aldehyde groups with alcohols, amines, sulfinic acids, sulfyhydryl compounds and the like containing a linear or branched, saturated or unsaturated, substituted or non-substituted $C_8$ or higher aliphatic hydrocarbon moiety.

Incorporation of a hydrophilic moiety may be accomplished through co-addition of a monosubstituted polyoxyalkane derivative of the form

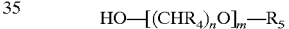

where
$R_4$=H, CH$_3$, n=1 to 4,
$R_5$=CH$_3$, C$_2$H$_5$, etc.
m≧1

Alternatively, ethoxylated fatty acid derivatives of the following form can be used to directly incorporate both functionalities onto the polysaccharide backbone as shown below.

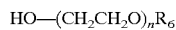

where
$R_6$ is an organofunctional radical containing a linear or branched, saturated or unsaturated, substituted or non-substituted $C_8$ or higher aliphatic hydrocarbon moiety.

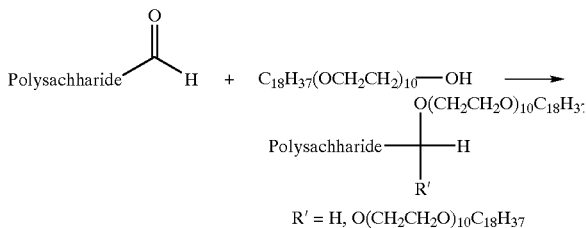

3) Direct reaction of a functionalized linear or branched, saturated or unsaturated, substituted or non-substituted $C_8$ or higher aliphatic hydrocarbon moiety with the hydroxyl or amine groups on the polysaccharide. An example of such a reaction is shown below for chitosan with 2-Octadecen-1-ylsuccinic anhydride.

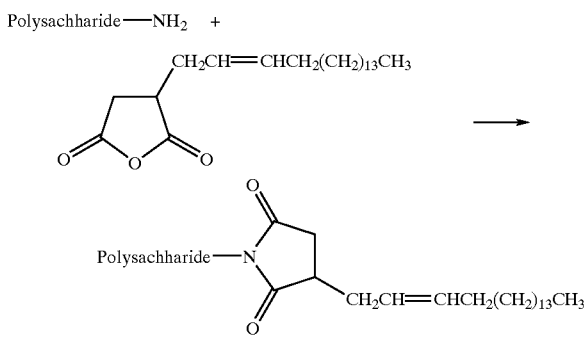

4) Graft polymerization of hydrophobic and or hydrophilic units onto the polysaccharide backbone. Modified vinyl monomers are capable of being grafted onto polysaccharide backbones as has been demonstrated for various starches. Use of modified vinyl monomers such as:

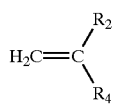

where:
$R_2$=H, $C_{1-4}$ alkyl.
$R_4$=$Z_2$—$R_6$—Y radical where:
  $Z_2$=Ar, $CH_2$, COO—, CONH—, —O—, —S—, —$OSO_2O$—, —CONHCO—, —CONHCHOHCHOO—, any radical capable of bridging the $R_6$ group to the vinyl backbone portion of the molecule.
  $R_6$=any aliphatic, linear or branched, saturated or unsaturated, substituted or non-substituted hydrocarbon.
  Y=H, —N+$R_7R_8R_9$, —N$R_7R_8$, where $R_7$, $R_8$, $R_9$ are same or different and are H or $C_{1-30}$ aliphatic hydrocarbons.
  At least one of $R_6$, $R_7$, $R_8$, $R_9$ must be a $C_8$ or higher, linear or branched, substituted or non-substituted, aliphatic hydrocarbon.

If desired hydrophilicity can be introduced through co-polymerization of modified vinyl polymers containing hydrophilic pendant groups such as:

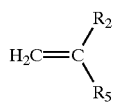

where:
$R_2$=H, $C_{1-4}$ alkyl.
$R_5$=any hydrophilic group including —COOH, —CONH$_2$, —COO$^-$, —(CH$_2$CH$_2$O)$_n$OH.
A specific example is shown below:

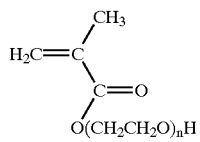

In the first method for incorporating aliphatic hydrocarbon moieties into the polysaccharide and monosaccharide based materials, the hydrocarbon moieties are added via reaction between a functional group on the starch and a second functional group attached to the reagent containing the aliphatic hydrocarbon moiety.

In the second method, however, two functional groups are attached to hydrocarbon containing reagent. The polysaccharides may be derivatized or non-derivatized, cationic or non-cationic. The general reaction scheme is defined as follows:

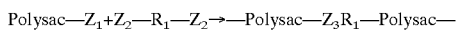

where:
$Z_1$=functional group attached to the polysaccharide molecule and may be present either from the natural state or from a derivatization process. Examples of $Z_1$ functional groups include but is not limited to —OH, —NH$_2$, —COOH, —CH$_2$X (X=halogen), —CN, —CHO, —CS$_2$.
$Z_2$=Functional group attached to the $R_1$ moiety whose purpose is to react with a $Z_1$ functional group thereby attaching the $R_1$ moiety covalently to the polysaccharide.
$Z_3$=Bridging radical formed as the result of reaction of $Z_1$ with $Z_2$.
$R_1$=any organofunctional group with the only limitation being that $R_1$ must contain a moiety consisting of a saturated or unsaturated, substituted or unsubstituted, linear or branched $C_8$ or higher aliphatic hydrocarbon.

Figure 2:
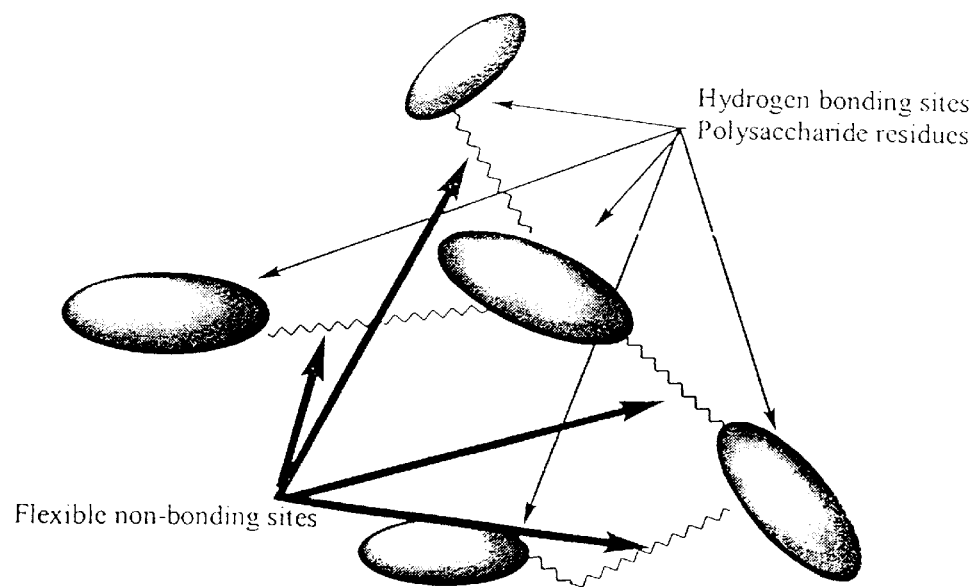
FIG. 2 shows a macroscopic structure of amphiphilic moieties attached in series to a polysaccharide molecules.

Such materials in general will have a macroscopic structure as shown in FIG. 2 where the aliphatic moieties are attached in series to the polysaccharide or monosaccharide molecules. When employed in cellulosic structures these materials can be thought of as providing "spot welds" to the web consisting of regions of strong hydrogen bonding connected to other regions of high hydrogen bonding through flexible non-bonding links. The combination of such properties could provide for a cellulosic product having a very unusual combination of strength and softness.

Where decreased water solubility becomes an issue a second moiety, containing a hydrophilic portion may be attached to the polysaccharide. Examples of such materials would include ethylene glycol and its oligomers and polymers.

In theory the polysaccharides could be of high molecular weight, however, the crosslinking would be expected to lead to water insoluble products, suitable perhaps for coatings but not useful for wet end applications. For wet end applications lower molecular weight polysaccharides including the oligomers as well as the monosaccharides and sugar derivatives are better candidates for this approach.

Synthesis of modified polysaccharides similar to those in FIG. 2 could be prepared via a number of methods. A few specific examples follow:
1) Polysaccharides crosslinked with α,ω-diacids or diacid halides of the formula:

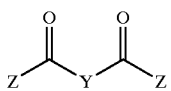

where:
Z=OH, halogen, other displaceable group.
Y=any residue chosen such that Y contains a $C_8$ or higher, linear or branched, saturated or unsaturated, substituted or non-substituted aliphatic hydrocarbon.

For example, polysaccharides may be crosslinked with α,ω-diacids or diacid chlorides of the following formula:

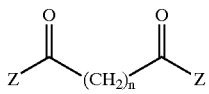

where:
Z=OH, halogen, any other displaceable group.
n=8 or higher

Where additional hydrophilic character is desired a second reagent of the same type can be employed with the exception that Y=any hydrophilic residue. A specific example would be:

HOOCCH$_2$(OCH$_2$CH$_2$)$_n$OCH$_2$COOH where
n=2–1000.

The displaceable groups on the reactants can react with either primary —OH or —NH$_2$ groups on the saccharide to form the corresponding ester or amide.

Figure below illustrates a specific synthetic approach to making such polysaccharides:

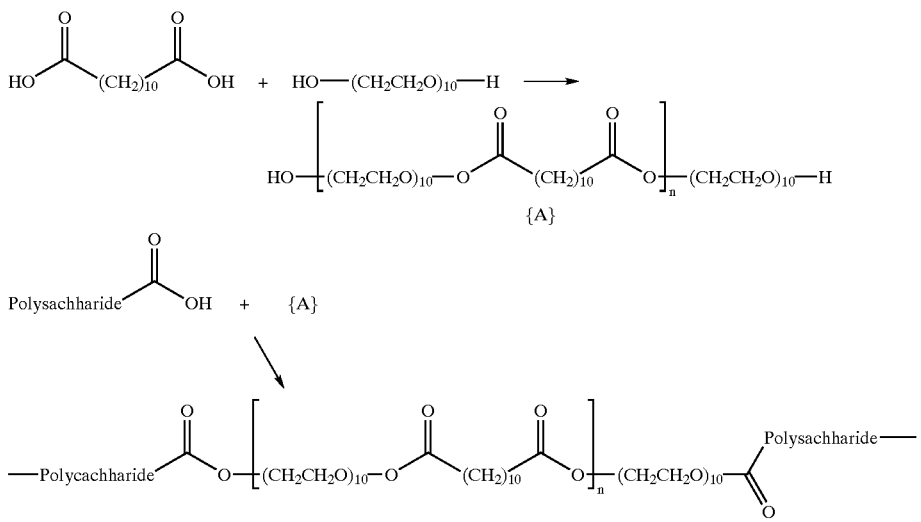

Many sugar derivatives contain α,ω-difunctionality and can lend themselves well to copolymer formation. For example, the following is illustrative of an aliphatic hydrocarbon sugar derivative combination. In this particular example strength is developed through hydrogen bonding via the polyhydroxy component while the aliphatic hydrocarbon portion provides a unique softness component.

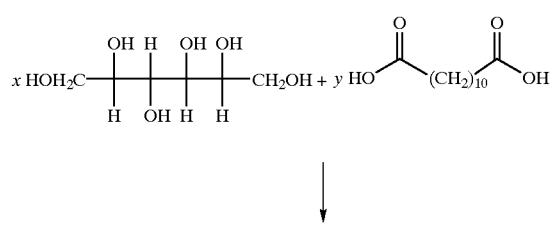

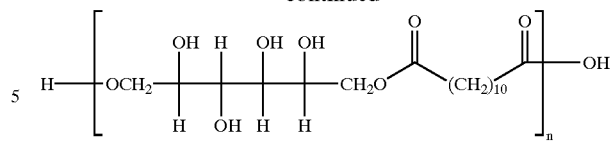

where:
x=y≧1
n≧1

It will be appreciated that the foregoing examples, given for purposes of illustration, shall not be construed as limiting the scope of this invention, which is defined by the following claims and all equivalents thereto.

We claim:

1. A soft tissue sheet comprising a modified polysaccharide containing one or more aliphatic hydrocarbon moieties, said modified polysaccharide having the following structure:

Polysac—Z$_3$R$_1$ where
Polysac=is starch dextrin natural gum, carboxymethyl cellulose or chitocan;
R$_1$=an organofunctional group containing a moiety consisting of a C$_8$ or higher aliphatic hydrocarbon; and
Z$_3$=—OCNH—.

2. A method of making a soft tissue sheet comprising the steps of: (a) forming an aqueous suspension of papermaking fibers; (b) depositing the aqueous suspension of papermaking fibers onto a forming fabric to form a web; and (c) dewatering and drying the web to form a soft tissue sheet, wherein a modified polysaccharide is added to the aqueous suspension or to the web during or after drying, said modified polysaccharide having the following structure:

Polysac—Z$_3$R$_1$ where
Polysac–is starch, dextrin, natural gum, carboxymethyl cellulose or chitosen;
R$_1$=an organofunctional group containing a moiety consisting of a C$_8$ or higher aliphatic hydrocarbon; and
Z$_3$=—OCNH—.

3. The method of claim 2 wherein the modified polysaccharide is added to the aqueous suspension of fibers.

4. The method of claim 2 wherein the modified polysaccharide is added to the web during drying.

5. The method of claim 2 wherein the modified polysaccharide is added to the dried web.

* * * * *